United States Patent [19]

Rahn et al.

[11] 4,216,440

[45] Aug. 5, 1980

[54] SURFACE ACOUSTIC WAVE TUNING FOR LASERS

[75] Inventors: John P. Rahn; Richard S. Hughes, both of Ridgecrest, Calif.

[73] Assignee: The United States of America as represented by the Secretary of the Navy, Washington, D.C.

[21] Appl. No.: 937,659

[22] Filed: Aug. 28, 1978

[51] Int. Cl.² .............................................. H01S 3/10
[52] U.S. Cl. .......................... 331/94.5 C; 331/94.5 M; 350/358
[58] Field of Search ................... 331/94.5 C, 94.5 M, 331/94.5 Q, 94.5 K, 94.5 D; 350/358

[56] References Cited

U.S. PATENT DOCUMENTS

| | | | |
|---|---|---|---|
| 3,633,995 | 1/1972 | Lean | 350/361 |
| 3,633,996 | 1/1972 | Lean et al. | 350/358 |
| 3,855,544 | 12/1974 | Hughes | 331/94.5 |
| 3,872,407 | 3/1975 | Hughes | 332/7.51 |
| 3,902,137 | 8/1975 | Hughes | 331/94.5 |
| 3,931,592 | 1/1976 | Hughes | 331/94.5 |
| 3,940,713 | 2/1976 | Hughes | 331/94.5 |
| 3,959,739 | 5/1976 | Hutcheson et al. | 331/94.5 |
| 4,028,636 | 6/1977 | Hughes | 331/94.5 |

Primary Examiner—William L. Sikes
Attorney, Agent, or Firm—R. S. Sciascia; W. Thom Skeer; Kenneth G. Pritchard

[57] ABSTRACT

A tunable laser using surface acoustic waves in the sides of a piezoelectric prism to provide two reflective diffraction gratings for tuning the resonant cavity.

11 Claims, 2 Drawing Figures

SURFACE ACOUSTIC WAVE TUNING FOR LASERS

BACKGROUND OF THE INVENTION

1. Field of the Invention

This invention relates generally to tunable lasers. In particular, this invention relates to the use of surface acoustic waves in a piezoelectric material to tune a laser.

2. Description of the Prior Art

Ultrasonic devices have been employed in the prior art to tune lasers. U.S. Pat. No. 3,940,713 and U.S. Pat. No. 4,028,636, both to Richard Swart Hughes, illustrate the use of bulk ultrasonic waves in the volume of an acoustic cell to tune lasers. U.S. Pat. No. 3,931,592, also to Richard Swart Hughes, shows how surface acoustic waves in a piezelectric crystal having a single reflective surface act as a diffraction grating which may be used to tune a laser. Other methods of tuning lasers use rotatable mirrors and gratings.

SUMMARY OF THE INVENTION

The present invention uses diffraction by acoustic waves in the sides of a piezoelectric prism to tune a laser. A fully reflective mirror is placed near one end of the laser medium and a prism made of a piezoelectric material is placed near the other end. Electrodes in interdigital patterns are attached to the prism in order to produce surface acoustic waves thereon. Varying the frequency of electrical energy applied to the electrodes produces variable-frequency surface acoustic waves in the sides of the prism. Diffraction of part of the beam from surface acoustic waves at either side of the prism and retroreflector from a plane reflective grating result in a variable-frequency feedback which is used to tune the laser.

Part of the beam incident upon the prism from the laser medium is internally reflected at each side of the prism to form the output of the laser.

The advantage of the present invention is that the surface acoustic waves from both sides of the prism and the bulk refractive index variation contribute to deflect the light to yield a higher deflection efficiency than is found in the prior art. Taking the output to be the specularly reflected light from the prism obviates the need for a high deflective efficiency.

DESCRIPTION OF THE PREFERRED EMBODIMENT

Figure 1:
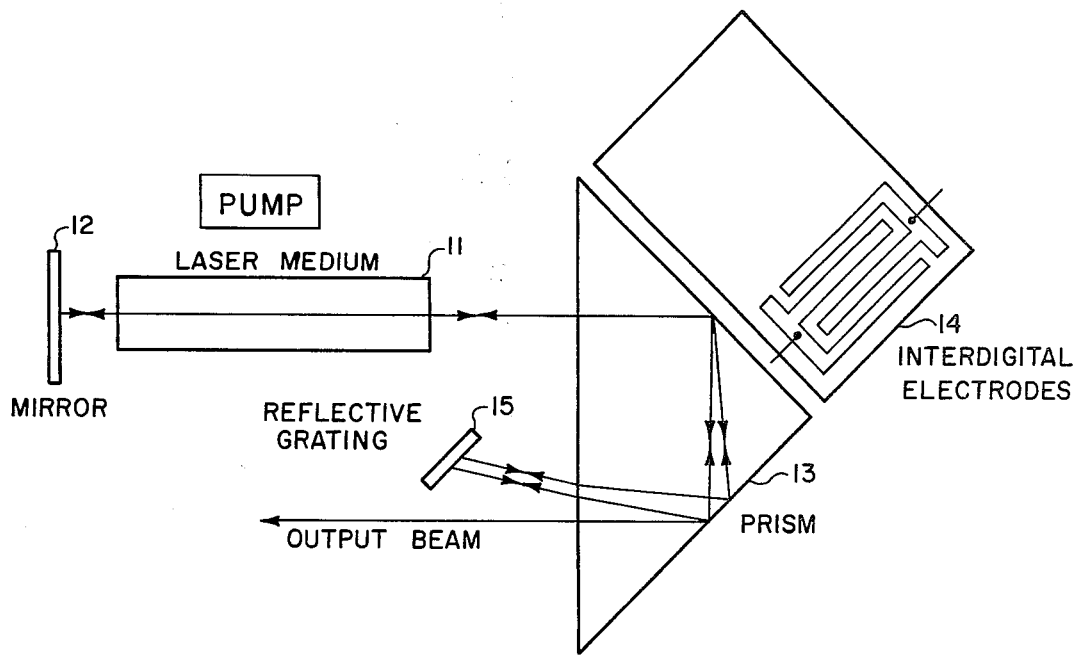
FIG. 1 is a plan view and a folded out view of one side of the preferred embodiment of the invention.

FIG. 1 shows the essential features of the invention A laser medium 11 produces a beam of electromagnetic radiation. A fully reflective means such as mirror 12 is positioned at one end of laser medium 11 to reflect incident electromagnetic radiation back into laser medium 11 and to define one end of the laser resonant cavity. A prism 13 made of a piezoelectric material is positioned at the other end of laser medium 11. The base of prism 13 is perpendicular to the beam from laser medium 11 and has an anti-reflective coating. A beam incident upon the base of prism 13 from laser medium 11 will impinge upon a side of prism 13.

Sets of electrodes 14 in interdigital patterns are attached to the sides of prism 13. A source of electrical energy, not shown, is connected to electrodes 14. Application of a periodic electrical waveform to electrodes 14 excites surface acoustic waves in the sides of prism 13. The surface acoustic waves produce periodic deformations in the sides of prism 13 and cause each side to be a reflective diffraction grating. The angle $\theta$ of diffraction is given by:

$$\theta = \lambda/\Omega \cos i$$

where:
- $\lambda$ is the wavelength of the laser light;
- $\Omega$ is the wavelength of the acoustic wave; and
- $i$ is the angle of incidence of the laser beam on the side of the prism.

U.S. Pat. No. 3,931,592 to Richard Swart Hughes contains a more detailed discussion of the structure and operation of surface acoustic wave devices.

Thus a beam from laser medium 11 incident upon a side of prism 13 will be partially diffracted and partially internally reflected. Both the diffracted and reflected beams are directed toward the other side of prism 13 with the angle between the two beams equal to the angle of diffraction. Each of the two beams from the first side of prism 13 is partially internally reflected at the second side of prism 13. Rays that internally reflect at both sides of prism 13 form the output beam of the laser. Rays that diffract at the first side and reflect at the second side and rays that reflect at the first side and diffract at the second side impinge upon a reflective grating 15, which defines the second end of the laser resonant cavity. Rays that retroflect from grating 15 back into laser medium 11 are the laser feedback. Thus laser medium 11 and the resonant cavity defined by mirror 12 and grating 15 constitute a source of coherent electromagnetic radiation.

The laser is tuned by varying the frequency of the surface acoustic waves, which varies the angle of diffraction at the sides of prism 13. The angle of diffraction at the sides of prism 13 determines the frequency fed back into the laser material.

Figure 2:
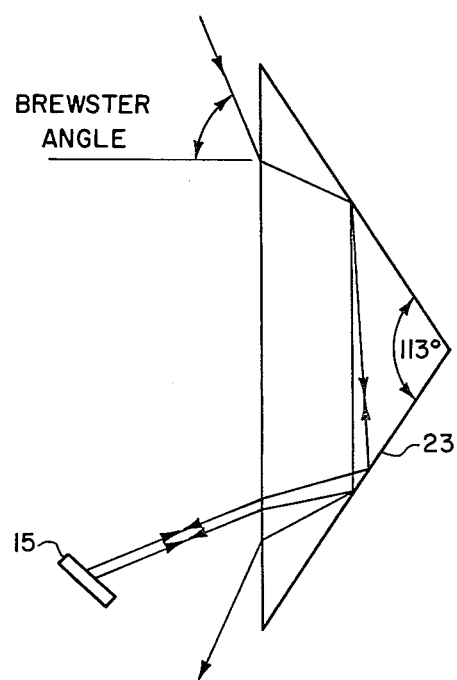
FIG. 2 is a plan view of a prism that may be used at Brewster's angle in the preferred embodiment.

FIG. 2 shows a particular prism design using lithium niobate. The vertex angle of prism 23 is approximately 113°. If the angle of incidence of the beam from laser medium 11 upon the base of prism 23 equals the Brewster angle, then the polarized beam will be perfectly transmitted, and an anti-reflective coating will be unnecessary.

What is claimed is:

1. A tunable laser comprising:
   a lasing medium for emitting a beam of coherent electromagnetic radiation along a predetermined path;
   means for pumping said lasing medium to cause emission of said coherent beam;
   means for totally reflecting said coherent beam placed near said lasing medium in said path for creating one end of a resonant cavity;
   a prism with a base and two sides in said path on the other side of said lasing medium than said reflecting means for transmitting said coherent beam through the base and into said prism such that it strikes one of said sides at an angle that produces total internal reflection to said second side where total internal reflection occurs again to produce an output beam from said prism through said base;

a means for producing variable frequency surface acoustic waves in said sides of said prism for making each side of said prism a reflective diffraction grating to said coherent beam in a predetermined manner whereby said coherent beam is divided into a plurality of beams within said prism that has an output with a selected frequency; and a reflecting grating in the path of said output beam from said prism base positioned to reflect part of said output beam from said prism base so as to create a second end of a resonant cavity defined by said path followed by said coherent beam.

2. A tunable laser according to claim 1 wherein said prism is made of a piezoelectric material.

3. A tunable laser according to claim 2 wherein said piezoelectric material is lithium niobate.

4. A tunable laser according to claim 1 wherein said means for producing variable-frequency surface acoustic waves comprises:

a source of variable-frequency electrical energy; and a means for converting electrical energy into surface acoustic waves connected to said source of variable frequency electrical energy.

5. A tunable laser according to claim 5 wherein said means for converting electrical energy into surface acoustic waves comprises electrodes in an interdigital pattern attached to said prism.

6. A tunable laser as described in either claim 3 or claim 1 wherein said prism further comprises a vertex angle of approximately 113° and is placed in said path of said coherent beam so as to have said base intercept said coherent beam at the Brewster angle.

7. A device for splitting a beam of electromagnetic radiation into a plurality of beams comprising:

a prism having at least a base and two sides such that when said beam is transmitted through said base said beam undergoes total internal reflection at each of said sides and is emitted through said base; and a means for producing variable frequency surface acoustic waves in said prism sides so that each side of the prism acts as a reflective diffraction grating when said beam undergoes total internal reflection at said sides so as to convert said beam into a plurality of beams.

8. A device for splitting a beam of electromagnetic radiation into a plurality of beams according to claim 7 wherein said prism is made of a piezoelectric material.

9. A device for splitting a beam of electromagnetic radiation into a plurality of beams according to claim 8 wherein said piezoelectric material is lithium niobate.

10. A device for splitting a beam of electromagnetic radiation into a plurality of beams according to claim 7 wherein said means for producing variable frequency surface acoustic waves comprises:

a source of variable frequency electrical energy; and a means for converting electrical energy into surface acoustic waves connected to said source of variable frequency electrical energy.

11. A device for splitting a beam of electromagnetic radiation into a plurality of beams according to claim 10 wherein said means for converting electrical energy into surface acoustic waves comprises electrodes in an interdigital pattern attached to said prism.

* * * * *